(12) United States Patent
Guschall et al.

(10) Patent No.: US 8,985,339 B2
(45) Date of Patent: Mar. 24, 2015

(54) METHOD AND EQUIPMENT FOR CONDITIONING LOW-METAL PLASTIC SCRAP

(75) Inventors: Heiner Guschall, Hilchenbach (DE); Daniel Goldmann, Goslar (DE)

(73) Assignees: Volkswagen AG, Wolfsburg (DE); Sicon GmbH, Hilchenbach (DE)

( * ) Notice: Subject to any disclaimer, the term of this patent is extended or adjusted under 35 U.S.C. 154(b) by 837 days.

(21) Appl. No.: 12/937,519

(22) PCT Filed: Mar. 21, 2009

(86) PCT No.: PCT/EP2009/002103
§ 371 (c)(1),
(2), (4) Date: Dec. 20, 2010

(87) PCT Pub. No.: WO2009/124650
PCT Pub. Date: Oct. 15, 2009

(65) Prior Publication Data
US 2011/0094941 A1    Apr. 28, 2011

(30) Foreign Application Priority Data

Apr. 12, 2008 (DE) .................. 10 2008 018 527
Jun. 2, 2008 (DE) .................. 10 2008 026 416

(51) Int. Cl.
*B07B 9/00* (2006.01)
*B03B 9/06* (2006.01)
(Continued)

(52) U.S. Cl.
CPC .............. *B03B 9/061* (2013.01); *B29B 17/02* (2013.01); *C22B 7/005* (2013.01);
(Continued)

(58) Field of Classification Search
USPC ............ 209/12.1, 38, 3, 8, 31; 241/19, 24.14, 241/79.1
See application file for complete search history.

(56) References Cited

U.S. PATENT DOCUMENTS

| 3,738,483 A | 6/1973 | MacKenzie |
| 4,026,678 A | 5/1977 | Livingston |

(Continued)

FOREIGN PATENT DOCUMENTS

| DE | 41 00 346 | 7/1992 |
| DE | 42 05 309 | 8/1993 |

(Continued)

OTHER PUBLICATIONS

International Search Report and Written Opinion, PCT/EP2009/002103, dated Jul. 21, 2009.

(Continued)

*Primary Examiner* — Joseph C Rodriguez
*Assistant Examiner* — Kalyanavenkateshware Kumar
(74) *Attorney, Agent, or Firm* — Kenyon & Kenyon LLP (57) ABSTRACT

In a method and an arrangement for treating a light fraction that is produced during the treatment of plastic-rich waste that is low in metal, at least the following steps are carried out consecutively: the light fraction is stressed by percussion and/or bashing, the light fraction is classified into at least two light fraction classes, at least one light fraction class is separated into at least one light material fraction and a heavy material fraction, at least one light material fraction is cleaned. The cleaning of the light material fraction (fibrous material), obtained after the separation, provides a very clean initial substance to be obtained, resulting in clearly improved material recycling and energy recovery.

33 Claims, 3 Drawing Sheets

(51) Int. Cl.
  *B29B 17/02* (2006.01)
  *C22B 7/00* (2006.01)
  *B29B 17/00* (2006.01)
  *B29B 17/04* (2006.01)
  *B29K 105/06* (2006.01)
  *B29K 705/04* (2006.01)

(52) U.S. Cl.
  CPC ...... *B03B 2009/068* (2013.01); *B29B 17/0026* (2013.01); *B29B 2017/0224* (2013.01); *B29B 2017/0231* (2013.01); *B29B 2017/0272* (2013.01); *B29B 2017/0488* (2013.01); *B29B 2017/0492* (2013.01); *B29K 2105/065* (2013.01); *B29K 2705/04* (2013.01)
  USPC .............................. 209/31; 209/12.1; 241/19

(56) References Cited

U.S. PATENT DOCUMENTS

| | | | |
|---|---|---|---|
| 4,242,197 | A | 12/1980 | Voelskow et al. |
| 4,245,999 | A | 1/1981 | Reiniger |
| 4,623,515 | A | 11/1986 | Frei et al. |
| 4,874,134 | A | 10/1989 | Wiens |
| 5,184,780 | A | 2/1993 | Wiens |
| 5,522,554 | A * | 6/1996 | Blank et al. ............... 241/23 |
| 5,527,432 | A | 6/1996 | Leuthold et al. |
| 5,908,165 | A | 6/1999 | Guschall et al. |
| 6,070,733 | A | 6/2000 | Osing |
| 6,086,000 | A * | 7/2000 | Murata ..................... 241/19 |
| 6,372,085 | B1 | 4/2002 | Hsu et al. |
| 6,422,493 | B1 | 7/2002 | Simon et al. |
| 6,422,616 | B1 | 7/2002 | Wortmann et al. |
| 6,974,097 | B2 | 12/2005 | Simon et al. |
| 7,325,757 | B2 | 2/2008 | Allen et al. |
| 8,469,296 | B2 | 6/2013 | Knust et al. |
| 2004/0089102 | A1 | 5/2004 | Goldmann et al. |
| 2004/0251335 | A1 | 12/2004 | Goldmann et al. |
| 2005/0156442 | A1 | 7/2005 | Koppenhoehl et al. |
| 2007/0158242 | A1 * | 7/2007 | Goldmann et al. ............ 209/38 |

FOREIGN PATENT DOCUMENTS

| | | |
|---|---|---|
| DE | 42 22 379 | 1/1994 |
| DE | 43 06 781 | 9/1994 |
| DE | 44 26 503 | 2/1996 |
| DE | 44 37 852 | 5/1996 |
| DE | 44 42 631 | 6/1996 |
| DE | 195 00 224 | 7/1996 |
| DE | 196 29 470 | 1/1998 |
| DE | 196 29 473 | 1/1998 |
| DE | 197 55 629 | 6/1999 |
| DE | 199 11 010 | 10/2000 |
| DE | 199 15 481 | 10/2000 |
| DE | 102 24 133 | 3/2003 |
| DE | 103 34 646 | 3/2005 |
| DE | 103 36 802 | 3/2005 |
| DE | 10 2004 045 821 | 3/2006 |
| EP | 0 418 194 | 3/1991 |
| EP | 0 479 293 | 4/1992 |
| EP | 0 623 390 | 11/1994 |
| EP | 0 884 107 | 12/1998 |
| EP | 1 020 225 | 7/2000 |
| EP | 1 332 001 | 8/2003 |
| EP | 1 333 931 | 8/2003 |
| EP | 1 337 341 | 8/2003 |
| EP | 1 721 676 | 11/2006 |
| WO | 98/01276 | 1/1998 |

OTHER PUBLICATIONS

Search Report, German Patent Application No. 10 2008 026 416.4, dated Dec. 11, 2008.

International Search Report and Written Opinion, PCT/EP2009/002104, dated Jul. 21, 2009.

Search Report, German Patent Application No. 10 2008 026 417.2, dated Jun. 2, 2010.

International Search Report and Written Opinion, dated Dec. 29, 2009, issued in corresponding International Application No. PCT/EP2008/002146.

International Search Report and Written Opinion, dated Jul. 21, 2009, issued in corresponding International Application No. PCT/EP2009/001699.

German Search Report, dated Oct. 9, 2008, issued in corresponding German Patent Application No. 10 2008 016 417.8.

German Search Report, dated Nov. 24, 2009, issued in corresponding German Patent Application No. 10 2009 009 873.9.

* cited by examiner

METHOD AND EQUIPMENT FOR CONDITIONING LOW-METAL PLASTIC SCRAP

FIELD OF THE INVENTION

The present invention relates to a method and equipment for conditioning a light fraction that has been produced during the conditioning of low-metal scrap high in plastics.

BACKGROUND INFORMATION

Such a light fraction is obtained, for example, from the shredding of scrap vehicles. The shredding of scrap vehicles and similar material flows for material breakdown with the aim of improved material usage has been known for a long time. Scrap bodyshells, that are first stripped by local scrap vehicle reuse organizations of economically usable parts (substantially replacement parts) and unloaded of harmful substances (e.g. by removing operating fluids) are fed to shredder equipment without major pretreatment by shredder operations. In the established method management in carrying out the shredding process, process controls have been established in which the material mixture obtained is divided up into different fractions.

In the shredder equipment working on the principle of a hammer mill, the scrap bodyshell is broken into pieces the size of one's fist. Subsequently to the size reduction process, components capable of flying are suctioned off using a suitable suction machine and are segregated via a cyclone separator (the so-called light shredder fraction (SLF). The remaining air flow is fed to a dust removal. The remaining fraction that is not suctioned off is subsequently separated into a ferromagnetic fraction (so-called shredder scrap (SS)) and a non-ferromagnetic fraction (so-called heavy shredder fraction (SSF)), using a suitable magnetic separator.

The shredder scrap (SS) is used directly as secondary raw material in steel works, the heavy shredder fraction (SSF) is conditioned separately, and separated into metallurgically usable metal fractions and a metal-depleted residual fraction. Beside these residues from the heavy shredder fraction (SSF), the light shredder fraction (SLF) remains as an extremely heterogeneous mixtures of plastics, foamed plastics, rubber, textiles, glass, ceramics, wood, ferrous and nonferrous metals. According to present systems, the so-called shredder residues, thus formed by the light shredder fraction (SLF) and/or the residual fraction from the conditioning of the heavy shredder fraction (SSF) that is not metallurgically usable, are disposed of as waste, as a rule, or burnt in waste incineration plants. In the light of rising legal requirements (such as the EU scrap auto guide lines), rising landfill costs and rising requirements on landfill material, as high a rate of use of all the fractions created in the shredder process would be desirable. Thus, the Scrapped Car Regulation of Apr. 1, 1998 even provides for over 95 wt. % of a scrapped car having to be utilized as of the year 2015. In addition, increased requirements from the EU Scrapped Car Guideline passed in September, 2000 specify that, in scrap car utilization, the proportion of material streams utilizable again as materials and raw materials should be increased to at least 85 wt. %.

Utilization of light shredder fraction (SLF) of a safe quality (materially, for instance, in blast or cupola furnaces or even energetically, for instance, for use as fuel in cement works or power plants) is, according to current knowledge, only possible under ecologically or economically defensible conditions if the shredder residues or the light shredder fraction (SLF) are split up with the aid of suitable conditioning steps into as high-valued, homogeneous subfractions as possible.

European Published Patent Application No. 1 333 931 describes a method for the conditioning in common of shredder fractions in which, among other things, a qualitatively high value or materially or energetically usable lint fraction is able to be produced. In this context, in preprocesses, the light shredder fraction (SLF), the heavy shredder fraction (SSF) and the material flows created in the preprocesses are conditioned and, at least in parts, in a common main process, a raw lint fraction is produced by the segregation of at least one ferromagnetic fraction, an NE metal-containing fraction, a granulate fraction and a sand fraction. The raw-lint fraction thus produced, which is already very homogeneous, is split up in a further refining process by the successive process steps of treating with metal balls, dedusting and density separation into a metal-containing dust fraction, a lint fraction low in dust and metals, and a metallic fraction. The high-value lint fraction produced thereby may be used without a problem for material or energy purposes.

German Published Patent Application No. 102 24 133 describes a method for treating mud, which is supposed to be used for efficient mechanical dehydration in the preliminary stages of a later thermal treatment of the mud. It is proposed, among other things, that one feed in additives to the mud, in the form of a refined lint fraction, according to the method described in European Published Patent Application No. 1 333 931. Furthermore, reference is also made to the possibilities of an additional conditioning of the lint fraction thus refined, which includes the method steps of impact treatment, straining, density separation. The light fraction (lint) obtained from the density separation is combined with the overflow of the straining (also lint) and is submitted to the downstream alternative method steps of size reduction, agglomeration, pelletizing or briquetting. In addition, in the case of agglomeration, it is proposed that the material discharge of the agglomerate be submitted to the additional conditioning stages of sieving out non-agglomerated, lumpy parts, additional FE metal segregation, and material cooling during pneumatic conveying.

A method is described in German Published Patent Application No. 197 55 629 for conditioning the light shredder fraction from shredder systems, in which the complex light shredder fraction is subdivided by size reduction and separation into the four subtractions: shredder sand (substantially removed inert materials such as glass, sand, dirt), shredder granulate (substantially plastics granulate), metal granulate (substantially of isolated iron, copper and aluminum) and shredder lint (light substances capable of flying), the subtractions being supposed to be so homogeneous that they are able to be fed to a material and/or an energetic utilization.

Finally, in European Published Patent Application No. 1 337 341 a method is described for the joint conditioning of shredder fractions, in which the primary material flows created during the conditioning of the light shredder fraction and the heavy shredder fraction in preprocesses are fed, at least in part, to a common main process for the final conditioning. At least a ferromagnetic fraction, a fraction containing nonferrous metals, a granulate fraction, a sand fraction and a lint fraction are produced as end products. Let it be pointed out that the end products are able to be fed either directly to a material or energetic utilization, or that they may, if necessary, be processed further in additional refinement steps to form usable products of high quality.

SUMMARY

Example embodiments of the present invention provide a method and equipment, using which a light fraction, produced during the conditioning of low-metal scrap high in plastics, is able to be refined further such that a highly pure end product is obtained for highly efficient material utilization, but also for better energetic utilization.

According to the method of example embodiments of the present invention for conditioning a light fraction (lint), produced during the conditioning of low-metal, scrap high in plastics, at least the following method steps are carried out, one after the other:

applying stresses to the light fraction using impact and/or shock;

classifying the light fraction into at least two light fraction classes;

separation of at least one light fraction class into at least one light material fraction and one heavy material fraction; and     cleaning at least the light material fraction.

By cleaning the light material fraction (lint) obtained by the separation, one obtains a very pure output substance, whereby a clearly improved raw material use but also an energetic use is made possible.

The cleaning may take place in a dry state, namely by deducting. In this context, the light material fraction is freed in a centrifuge of heavy metal-encumbered dust (the latter substantially including lead and zinc), and the remaining material depleted in heavy metal thus becomes responsive to higher requirements on environmental compatibility.

It may be provided that the classification of the light fraction takes place by sieving, preferably at a diameter of hole of about 5-8 mm. In the selection of the hole diameter, by the sieving, at least a first light fraction class having an average part size range of <5-8 mm and a second light fraction class having an average part size range of >5-8 mm may be produced, which are easily processed further or are able to be split up.

The light material fraction (lint) obtained by separating the light fraction (raw lint) on average preferably has a bulk material weight of <250 kg/m3 and the heavy material fraction (granulate) obtained on average has a bulk material weight of >250 kg/m$^3$, especially >400 kg/m$^3$.

The light fraction (raw lint) that is to be further refined, may be a light fraction high in fiber, particularly having an average bulk material weight of <0.2 t/m$^3$, which is produced in a preprocess in the conditioning of low-metal scrap high in plastics (the latter being preferably at least partly shredder residues of scrap containing metal).

It may be provided that, for producing the light fraction (raw lint) during the conditioning of low-metal scrap high in plastics, at least the following method steps be carried out one after the other:

isolation of ferromagnetic components;

isolation of a first raw sand fraction;

isolation of metallic, non-ferromagnetic components;

isolation of coarse components;

reduction in size;

isolation of a first raw sand fraction; and sorting into at least one light fraction and one heavy fraction.

The light fraction (raw lint) produced in this manner represents an ideal output material for the method hereof, that may easily be further refined.

Before the impact treatment, the light fraction may be submitted to an Fe segregation.

The light material fraction, after cleaning, may be submitted to an agglomeration, particularly a discontinuous one, in order to transform the light material fraction (cleaned lint) into a state of being able to trickle. Before the agglomeration, however, the light material fraction should then be fed to a buffer, in order to ensure a decoupling of the agglomeration stage from the preprocess, and with that, an interference-free process operation. The agglomeration temperature selected should be approximately 100° C.-180° C., preferably approximately 140° C. The agglomeration being created should be cooled, in order, on the one hand, to prevent being able to handle it and, on the other hand, to prevent the self-ignition of the material in a storage bin or a prepackaging device. A first cooling using water already takes place in the agglomerator itself, cooling to about 45° C.-65° C., preferably to about 50° C.-60° C. taking place. After that, a further cooling/drying of the agglomerate may follow, in which a cooling, preferably using air (e.g. an air-conveying fan) takes place to environmental temperature. In this instance, a residual humidity content of <1.5% is aimed for, the latter being able to be achieved by an appropriate setting of the retention time in a suitable pneumatic conveying system.

The light fraction may be submitted to a metal segregation after the agglomeration. The lint material, slightly magnetized and treated with balls during the agglomeration, may be submitted, in this instance, to a metal segregation using a highly effective neodymium magnet. Nonmagnetic material carried along up to this point (e.g. copper particles or plastic granulate) is isolated and fed to an additional, separate process. What is left behind is a highly refined shredder lint agglomerate.

However, pelletting or briquetting of the light material fraction (cleaned lint) is also possible as an alternative to the agglomeration shown. In this case too, buffering of the light material fraction (cleaned lint) makes great sense, and is expedient especially with respect to making certain of great material availability.

It should be mentioned that the light material fraction (lint) obtained by the separation is merged with at least one light fraction class obtained by the classification. This will be the second light fraction class, having an average part size range of >5-8 mm, which is also present in the form of lint, and is thus available for a process-optimized joining together of these material flows.

The equipment according to example embodiments of the present invention for conditioning a light fraction, produced during the conditioning of low-metal scrap high in plastics, has devices by which consecutive method steps are able to be carried out:

applying stresses to the light fraction using impact and/or shock;

classifying the light fraction into at least two light fraction classes;

separation of at least one light fraction class into at least one light material fraction and one heavy material fraction; and     cleaning at least the light material fraction.

By cleaning the light material fraction (lint) obtained by the separation, one obtains a very clean output substance, whereby a clearly improved material use but also an energetic use is made possible.

A device provided for applying stress to the light fraction (raw lint) using impact and/or shock may be in the form of at least one rotor impact mill or at least one hammer mill. When a rotor impact mill is used, the distance between stator and rotor may be to be set between 3 mm and 5 mm. In that manner, a very good application of stress of the light fraction may be ensured using the desired ball treatment of copper strands or metal wires and other interfering substances that are still included in the light fraction.

If a hammer mill is selected for the mechanical application of stress to the light fraction, then it may be ensured by the selection of a suitable screen hole size and suitable striking tools that the retention time in the hammer mill is sufficient to lead to a satisfactory ball treatment of the copper strands and the metal wires.

A device for isolating ferromagnetic components, preferably at least one magnetic separator, particularly a magnetic drum or an overband magnetic device may be connected upstream of the device for applying stress to the light fraction using impact and/or shock.

Furthermore, the device for applying stress to the light fraction using impact and/or shock may have connected downstream from them a classification device, particularly a screening device having a hole size of about 5-8 mm.

The classification device may have a density separation device connected downstream from it, preferably a separating table in combination with an air sifting device, for the separation of at least one light fraction class into a light material fraction and a heavy material fraction. The density separation device, especially the air sizing device, may include a device for a regulatable dust removal by suction. The air sizing device may be situated over the separating table, for instance, and may have a suction device that is able to be regulated such that the speed of the suctioning air may be set as a function of the size or the weight of the particles to be suctioned.

The density separation device may have connected downstream from it a device for surface cleaning of at least the light material fraction, preferably in the form of a centrifuge having its axis of rotation aligned vertically. An effective depletion in the light fraction of heavy metal-containing dust is achieved thereby.

The device for surface cleaning may have connected downstream from it an agglomeration device, especially one that works discontinuously. In this context, a buffer may be connected upstream of the agglomeration device.

A cooling and drying device, preferably in the form of an air-conveying fan and/or in the form of a cooling water supply device may be connected downstream of the agglomeration device.

It may be provided for the ferromagnetic metal segregation to connect at least one neodymium magnet downstream from the agglomeration device.

Example embodiments of the present invention are described in more detail below with reference to the appended Figures.

DETAILED DESCRIPTION

Figure 1:
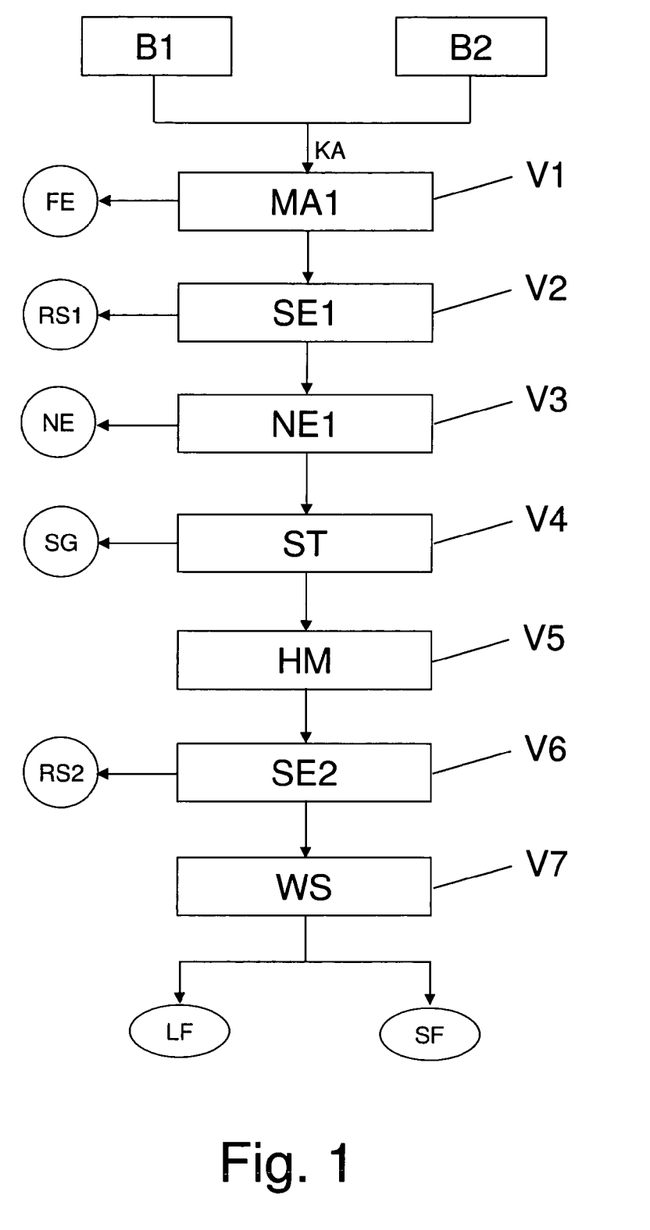
FIG. 1 is a schematic flow chart of the successive process steps for obtaining a light fraction LF (raw lint) high in plastics and a heavy fraction SF (raw granulate) high in plastics.

The schematic flow chart shown in FIG. 1 shows the process sequence in the conditioning of low-metal scrap high in plastics KA so as to obtain a heavy fraction SF high in plastics, and a light fraction LF high in plastics, which may be connected, for example, downstream from a shredder process of scrap vehicles.

Besides the low-metal plastics scrap from a shredder process, other plastic scrap may also be conditioned with the aid of the method and system described herein. When scrap vehicles are used, first of all, in a conventional shredder process, metal-containing scrap is first broken down by a size reduction process in a shredder. There follows an isolation of a light shredder fraction SLF, that is capable of flying, by a suction device. The heavy material flow that is not capable of flying, that remains after the suction, is separated on a magnetic separator into a ferromagnetic fraction and a non-ferromagnetic fraction. The ferromagnetic fraction is designated as shredder scrap, and it represents the primary product of the shredder that is able to be utilized directly in metallurgy. The remaining, heavy non-ferromagnetic fraction is designated as heavy shredder fraction SSF.

The light shredder fraction SLF is further conditioned, by itself or together with the heavy shredder fraction SSF and perhaps with additional low-metal scraps, and when they are submitted to the process described herein, they are designated as low-metal scrap high in plastics KA. This plastic scrap has a metal proportion of <20%, preferably a metal proportion in the range of magnitude of 5%.

One or more feed containers B1 and/or B2 are provided for feeding the low-metal plastics scrap, so as to decouple the conditioning process from upstream processes, such as the shredder process.

In a first method step V1, ferromagnetic components FE are isolated as a ferromagnetic fraction, using a magnetic separator MA1, and this fraction is able to be fed to a metallurgical conditioning process for recycled material utilization. This is followed by an isolation V2 of a first raw sand fraction RS1 using a screening device SE1, which in the exemplary embodiment has a size of hole in the range of 10-12 mm. Because of the isolation of this raw sand fraction, the subsequent process steps are relieved with respect to the isolated raw sand fraction. Next after method step V2, there is a process step V3, "segregation of non-ferromagnetic metal components" (non-ferromagnetic metal fraction), such as copper, brass and aluminum. A device NE1 may be used in this instance, for eddy current segregation or for sensitive metal isolation using color detection or off color detection. The use of the equipment VARISORT of the firm of S & S GmbH may be provided for this purpose. The subsequent process step V4 of the isolation of coarse components substantially reduces wear in next process step V5 of the main size reduction. A device ST, so-called air knife systems, may be used in process step V4 for the isolation of the coarse components SG for air current separation. After the isolation of the heavy material, in process step V5 a size reduction takes place of the remaining fractions, using a hammer mill HM. The size reduction takes place in this instance such that the volume of the light fraction LF (raw lint) contained in the remaining fractions is increased, whereby in a later process step V7 an improved and cleaner fraction splitting up of the remaining fractions into a light fraction LF (raw lint) and a heavy fraction SF (raw granulate) is possible. A device (WS) for air sizing is provided for splitting up the remaining fraction, according to the exemplary embodiment. The heavy fraction SF (raw granulate) has an average bulk material weight of 0.3 t/m$^3$. Between process step V5 of size reduction, preferably at 20 mm, and process step V7 of splitting up the remaining fractions, a process step V6 is provided, in which a second raw sand fraction RS2 is isolated using a screening device SE2. The size of hole of screening device SE2 is preferably in the range of 4-6 mm.

Figure 2:
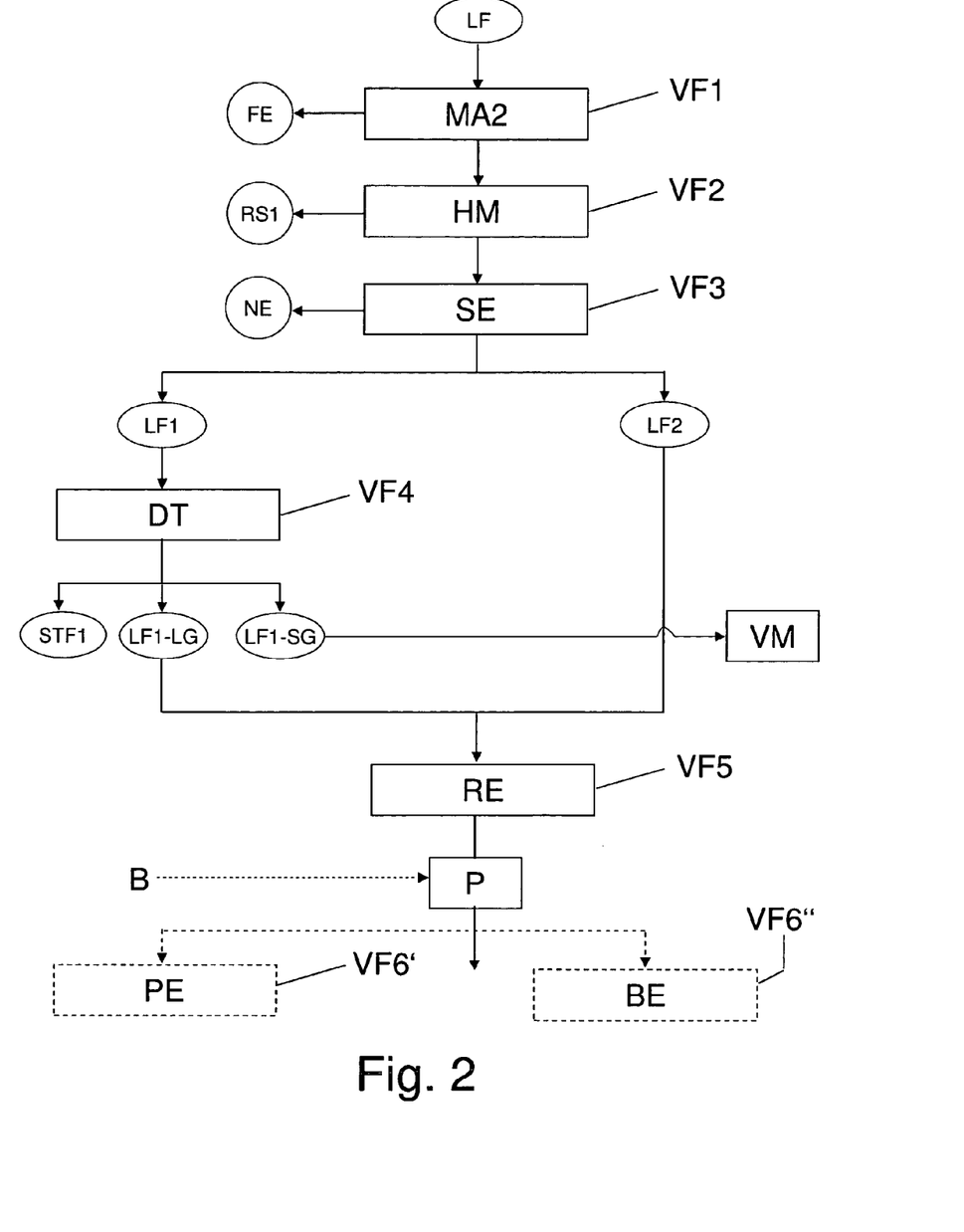
FIG. 2 is a schematic flow chart of a first part of the successive process steps for conditioning the light fraction LF (raw lint).
Figure 3:
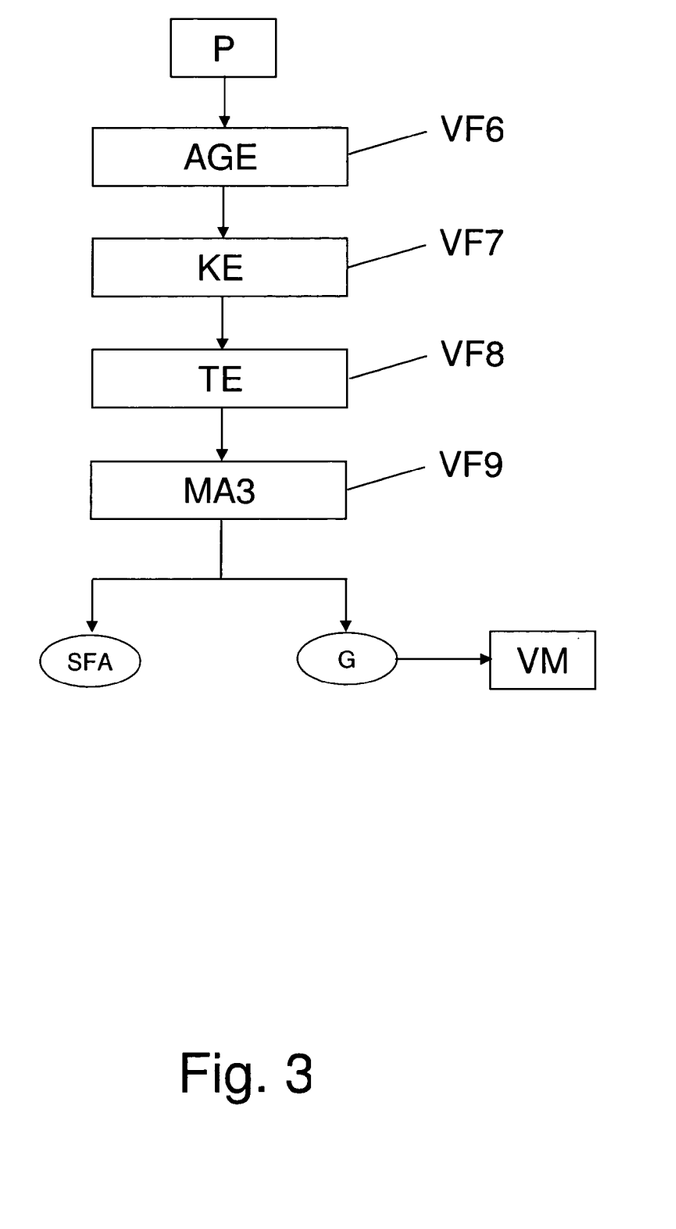
FIG. 3 is a schematic flow chart of a second part of the successive process steps for conditioning the light fraction LF (raw lint).

Light fraction LF (raw lint) thus produced is refined by the method shown in FIGS. 2 and 3, FIG. 2 showing the first part of the method (method steps VF1 to VF5 or optional method steps VF6, VF6") and FIG. 3 showing the second part of the method (method steps VF6 to VF9). During the refinement, light fraction LF is submitted in a first process step VF1 to the segregation of the ferromagnetic components FE, which are broken down during the reduction in size in process step V5. A magnetic separator MA2 is preferably used for this, for instance, a magnetic drum or an overband magnetic device.

In a next method step VF2, the material is submitted to a mechanical application of stress, particularly an impact treatment, preferably in a rotor impact mill or a hammer mill HM, whereby metal wires or copper wires and metal strands and copper strands present in the material are treated with metal balls.

Subsequently, in a downstream method step VF3, the material is fed to a classification device, preferably a screening device SE having a hole diameter of 5-8 mm. From this are created two light fraction classes LF1 and LF2, first light fraction class LF1 having the screen undersize material (smaller components of the screening material) having an average part size range of <5-8 mm, and second light fraction class LF2 having the screen oversize having an average part size range of >5-8 mm. The second light fraction class LF2 has a predominantly lint-type consistency.

In a subsequent method step VF4, first light fraction class LF1 is submitted to a density separation. As density separation device DT, a separating table is preferably used in combination with an air sizing device. It should be emphasized that density separation device DT (preferably the air sizing device) is equipped with a regulatable dust removal by suction, whereby light fraction class LF1 is split up into a very light dust fraction STF1 (which preferably is suctioned off already upon entry into density separation device DT), a light material fraction LF1-LG as well as a heavy material fraction LF1-SG.

Heavy material fraction LF1-SG has a granulate-shaped consistency having an average bulk material weight of about 400-500 kg/m$^3$, and includes copper in the form of strands or wires. Heavy material fraction LF1-SG is fed to an additional processing module VM.

Light material fraction LF1-LG is submitted, in a subsequent method step VF5, to cleaning by a special cleaning device RE.

In this context, cleaning device RE includes at least one centrifuge, in which a dry surface cleaning of light material fraction LF1-LG takes place. Specifically, light material fraction LF1-LG is dedusted using the centrifuge, that is, it is freed of heavy metal-encumbered dust STF2 (substantially including lead and zinc).

Light material fraction LF1-LG thus cleaned may subsequently be fed to pelletizing VF6' in a pelletting device PE or briquetting VF6" in a briquetting device BE, but it (LF1-LG) is preferably fed to agglomeration VF6. Agglomeration VF6 of light material fraction LF1-LG takes place in a suitable agglomeration device AGE at approximately 100° C. to 180° C., preferably at approximately 140° C. to 170° C., according to a discontinuous method, until a consistency is reached of the material (LF1-LG) where it is able to trickle. Based on the discontinuous agglomeration, a device of a material buffer P is required before agglomeration VF6. This, however, offers the advantage of the decoupling of method step VF6 from the upstream method steps, and offers the possibility of under-taking an additional charging B of material buffer P with other materials, even impact-treated materials.

The agglomerate created by agglomeration VF6 is cooled already while in the agglomerator using cooling water at about 50-60° C. The agglomerate may subsequently be cooled using a cooling device KE, but may be cooled further (VF7) to the environmental temperature. Cooling device KE may work with water, in this instance. However, cooling with air is also conceivable, for instance, the air of an air-conveying fan. In particular when cooling by water has taken place, drying VF8 is recommended using a suitable drying device TE. Drying VF8 may take place, for example, by air, even heated air. Method steps VF7 and VF8 may also be performed in parallel.

Finally, the agglomerate is fed to a metal segregation VF9, a neodymium magnet being preferably used as metal segregation device MA3, which achieves very high separating efficiency while having small dimensions. Using of metal segregation device MA3, the magnetic materials (during the agglomeration process, lint-type material (LF!-LG) became slightly magnetic) is isolated from the non-magnetic, predominantly copper-containing materials. Consequently, as the end products there are created a highly refined shredder lint agglomerate (SFA) and a copper/plastics granulate G. Copper/plastics granulate G (just as heavy material LF1-SG) is also fed to further processing module VM.

LIST OF REFERENCE CHARACTERS

AGE agglomeration device
B charging of material buffer P
B1, B2 feed container
BE briquetting device
DT density separation
FE ferromagnetic components
G copper/plastics granulate
HM hammer mill
KA low-metal plastics scrap high in plastics
KE cooling device
KU plastic material
LF light fraction, produced during the conditioning of plastics scrap low in metal
LF1 1$^{st}$ light fraction class having an average part size <5-8 mm
LF1-LG light material produced by density separation of 1$^{st}$ light fraction class LF1
LF1-SG heavy material produced by density separation of 1$^{st}$ light fraction class LF1
LF2 2$^{nd}$ light fraction class having an average part size >5-8 mm
MA1 metal segregation device
MA2 metal segregation device
MA3 metal segregation device
NE non-ferromagnetic metal parts
NE1 device for segregating non-ferromagnetic metal parts
P material buffer
PE pelletting device
RE cleaning device (centrifuge)
RS1 first raw sand fraction
RS2 second raw sand fraction
SE sifting device
SE1 first sifting device
SE2 second sifting device
SF heavy fraction, produced during the conditioning of plastics scrap low in metal
SFA shredder lint agglomerate
SG heavy material ST device for isolating heavy material
STF1 dust fraction, freed by method step VF4
STF2 dust fraction, freed by method step VF5
TE drying device
VM processing module, which includes further processing steps
V1-V7 process steps for conditioning low-metal plastic scrap
VF1-VF9 process steps for conditioning light fraction LF (raw lint), produced during the conditioning of low metal scrap KA high in plastics
WS device for splitting up into a light fraction and a heavy fraction

What is claimed is:

1. A method for conditioning a light fraction high in fibers, produced during conditioning of low metal scrap high in plastics, comprising:
after producing the light fraction high in fibers downstream from a shredder process:
applying stresses to the light fraction by at least one of (a) impact and (b) shock;
classifying the light fraction into at least two light fraction classes;
separating at least one light fraction class into at least one light material fraction and a heavy material fraction; and
cleaning at least the light material fraction.

2. The method according to claim 1, wherein the cleaning is performed in a dry state.

3. The method according to claim 1, wherein the cleaning includes dedusting.

4. The method according to claim 1, wherein the classifying includes at least one of (a) sifting and (b) sifting at a hole diameter of approximately 5 to 8 mm.

5. The method according to claim 1, wherein the classifying include producing at least one first light fraction class having an average part size range less than 5 to 8 mm and a second light fraction class having and average part size range greater than 5 to 8 mm.

6. The method according to claim 1, wherein the light material fraction obtained by the separating on average has a bulk material weight of less than 250 kg/m$^3$ and the heavy material fraction on average has a bulk material weight of at least one of (a) greater than 250 kg/m$^3$ and (b) greater than 400 kg/m$^3$.

7. The method according to claim 1, wherein the light fraction high in fibers has an average bulk material weight less than 0.2 t/m$^3$.

8. The method according to claim 1, wherein the scrap low in metal, high in plastics includes shredder residues of metal-containing scrap.

9. The method according to claim 1, wherein the producing the light fraction high in fibers comprises, successively:
isolating ferromagnetic components;
isolating a first raw sand fraction;
isolating non-ferromagnetic components;
isolating coarse components;
size reduction;
isolating a second raw sand fraction; and
sorting into at least one light fraction and a heavy fraction.

10. The method according to claim 1, further comprising an FE segregation before the impact treatment.

11. The method according to claim 1, further comprising submitting the light material fraction to least one of (a) an agglomeration and (b) a discontinuous agglomeration after the cleaning.

12. The method according to claim 11, wherein the agglomeration takes place at least one of (a) at approximately 100° C. to 180° C. and (b) at approximately 140° C. to 170° C.

13. The method according to claim 11, further comprising cooling the light material fraction after the agglomeration.

14. The method according to claim 13, wherein the cooling takes place at approximately an environmental temperature.

15. The method according to claim 11, further comprising, after the agglomeration, at least one of (a) drying the light material fraction and (b) drying the light material fraction to a residual moisture content of less than 1.5%.

16. The method according to claim 11, further comprising submitting the light material fraction to a metal segregation after the agglomeration.

17. The method according to claim 11, further comprising feeding the light material fraction to a buffer before the agglomeration.

18. The method according to claim 1, further comprising, after the cleaning, submitting the light material fraction to a pelletting process.

19. The method according to claim 1, further comprising, after the cleaning, submitting the light material fraction to a briquetting process.

20. The method according to claim 1, further comprising merging the light material fraction obtained by the separation with at least one of the light fraction classes obtained by the classification.

21. A system for conditioning a light fraction high in fibers, produced during conditioning of low metal scrap high in plastics, comprising:
downstream from a process adapted to produce the light fraction high in fibers downstream from a shredder process:
a device adapted to apply stresses to the light fraction by at least one of (a) impact and (b) shock;
a classification device adapted to classify the light fraction into at least two light fraction classes;
a separation device adapted to separate at least one light fraction class into at least one light material fraction and a heavy material fraction; and
cleaning device adapted to clean at least the light material fraction.

22. The system according to claim 21, wherein the device adapted to apply stress to the light fraction includes at least one of (a) at least one rotor impact mill and (b) at least one hammer mill.

23. The system according to claim 22, wherein the rotor impact mill includes a stator and a rotor, and wherein a distance between the stator and the rotor is between 3 mm and 5 mm.

24. The system according to claim 22, wherein the hammer mill has screen hole size having a hole diameter between 8 and 15 mm, and striking tools having a width between 6 mm and 14 mm.

25. The system according to claim 21, further comprising at least one of (a) at least one magnetic separator, (b) a magnetic drum, and (c) an overband magnetic device connected upstream of the device adapted to apply stress to the light fraction, adapted to isolate ferromagnetic components.

26. The system according to claim 21, further comprising at least one of (a) a classification device and (b) a screening device having a hole size of approximately 5 to 8 mm, connected downstream from the device adapted to apply stress to the light fraction.

27. The system according to claim 21, wherein the separation device includes at least one of (a) a density separation device and (b) a separating table in combination an air sifting device, adapted to separate at least one light fraction class into at least one light material fraction and a heavy material fraction.

28. The system according to claim 27, wherein the density separation device includes a device adapted for regulatable dust removal by suction.

29. The system according to claim 27, further comprising at least one of (a) a surface cleaning device and (b) a centrifuge adapted for surface cleaning of at least the light material fraction connected downstream from the density separation device.

30. The system according to claim 29, further comprising at least one of (a) an agglomeration device and (b) a discontinuous agglomeration device connected downstream from the surface cleaning device.

31. The system according to claim 30, further comprising a buffer connected upstream of the agglomeration device.

32. The system according to claim 30, further comprising at least one of (a) a cooling and drying device and (b) an air-conveying fan, connected downstream from the agglomeration device.

33. The system according to claim 30, further comprising at least one of (a) a ferromagnetic metal segregation device and (b) at least one neodymium magnet, connected downstream from the agglomeration device.

* * * * *